United States Patent [19]

Rotter et al.

[11] 4,123,791
[45] Oct. 31, 1978

[54] MAGNETIC TRANSDUCER DEVICE WITH OUTRIGGER BARS

[75] Inventors: Gerhard Rotter, Mission Viejo; Alojzy Bakowski, Arcadia; Donald L. Burdorf, Newport Beach, all of Calif.

[73] Assignee: BASF Aktiengesellschaft, Ludwigshafen, Fed. Rep. of Germany

[21] Appl. No.: 862,221

[22] Filed: Dec. 19, 1977

Related U.S. Application Data

[63] Continuation of Ser. No. 755,214, Dec. 29, 1976, abandoned.

[51] Int. Cl.² .............................................. G11B 5/22
[52] U.S. Cl. .................................. 360/130; 360/122
[58] Field of Search ............... 360/118, 130, 121–122, 360/128–129, 74

[56] References Cited

U.S. PATENT DOCUMENTS

| 3,684,841 | 8/1972 | Boehme | 360/118 X |
| 3,710,038 | 1/1973 | Sakai et al. | 360/122 |
| 3,812,536 | 5/1974 | Linke | 360/118 X |
| 4,016,601 | 4/1977 | Lazzari | 360/122 |

OTHER PUBLICATIONS

IBM Technical Disclosure Bulletin, vol. 19, No. 5, p. 1885, Oct. 1976.

Primary Examiner—John H. Wolff
Attorney, Agent, or Firm—Keil, Thompson & Shurtleff

[57] ABSTRACT

A magnetic transducer device for maintaining improved recording tape to transducer head contact at reduced contact pressure. A pair of vertical outrigger bars are mounted on either side of the transducer head transverse to the path of the recording tape. The surfaces of the vertical bars facing the recording tape are located slightly below the plane of the outer surface of the transducer head thereby maintaining a constant, shallow wrap angle of the recording tape over the transducer head. Furthermore, a second pair of horizontal outrigger bars are mounted on either side of and adjacent to the transducer head along an axis transverse to the path of the recording tape. The surfaces of these horizontal bars facing the recording tape are located in substantially the same plane as the outer surface of the transducer head, thereby providing support for the recording tape when the transducer head is positioned near the edge of the tape and preventing the edge of the tape from lifting from the head due to its upward flex curvature.

9 Claims, 3 Drawing Figures

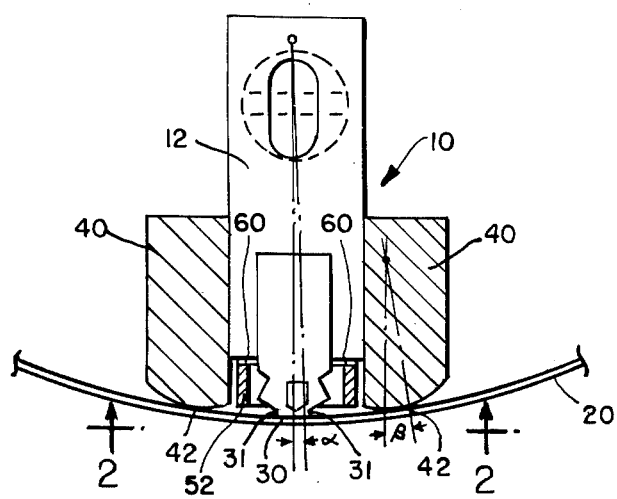
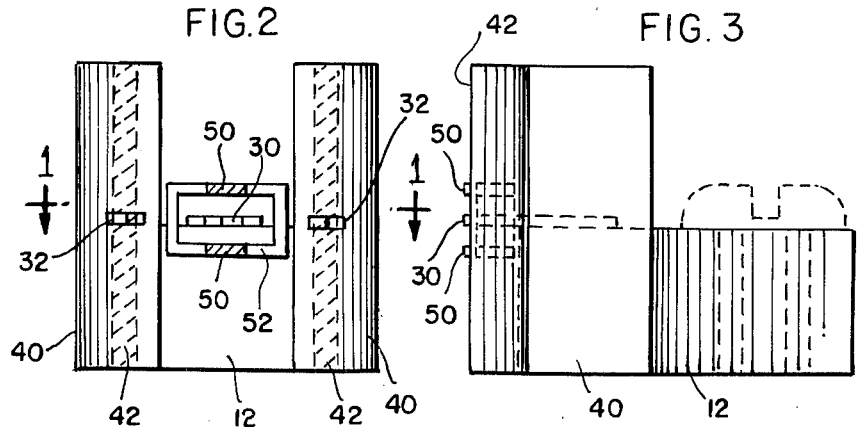

MAGNETIC TRANSDUCER DEVICE WITH OUTRIGGER BARS

This is a continuation of application Ser. No. 755,214 filed Dec. 29, 1976, now abandoned.

The present invention relates generally to a magnetic transducer device for maintaining improved recording tape to transducer head contact and more particularly, to a magnetic transducer device for use in video, audio, data and like recording systems which has outrigger bars positioned about the transducer head with their faces in substantially the same plane as the outer surface of the transducer head.

BACKGROUND OF THE INVENTION

It has been found with conventional magnetic transducer designs that satisfactory tape to head contact cannot be maintained when reduced contact pressures are used. This problem is particularly acute in high speed tape transport systems where the contact pressure between the tape and head must be minimized in order to reduce friction to an acceptable level thereby limiting wear and eliminating any scrape flutter caused by the vibrations created in the tape as it passes over the head.

More particularly, it has been found in high speed applications that any rounding of the leading edge of the tranducer head surface resulting from wear will cause the tape to lift or fly off of the head surface due to the lifting pressure caused by the boundary layer of air carried along the surface of the tape. Such tape fly necessarily causes undesirable high frequency signal attenuation. Furthermore, due to the inherent upward flex or curl curvature created along the edges of the recording tape as it is tensioned, it has been found with conventional head designs that it is not possible to record narrow signal tracks adjacent to the edges of the tape without similiar unsatisfactory high frequency signal attenuation.

SUMMARY OF THE INVENTION

Magnetic transducers designed in accordance with the present invention allow the tape to head contact pressure to be substantially reduced from that required by conventional transducer designs while maintaining satisfactory tape to head contact. Such improved results are accomplished by providing a pair of vertical outrigger bars mounted on either side of the transducer head transverse to the path of the recording tape. The surfaces of these vertical outrigger bars facing the recording tape are located slightly below the plane of the outer surface of the transducer head thereby maintaining a constant, shallow wrap angle of the recording tape over the transducer head. Hence, since the transducer head protrudes only very slightly into the plane of the recording tape and at a very precise, controlled angle with respect thereto, greatly reduced contact pressures can be achieved, thereby minimizing wear, tape fly and scrape flutter, while maintaining satisfactory tape to head contact.

Furthermore, with conventioanl head assembly designs, it has been found that in high speed systems utilizing low tape tensions even very small misalignments of the head surface to the tape surface will induce tape fly and corresponding high frequency signal attenuation. By contrast, the head assembly of the present invention avoids this problem in that the vertical outrigger bars will cause the tape to follow a constant contour across the head regardless of slight misalignments of the head assembly. In addition, the vertical outrigger bars of the present invention permit convenient placement of the system's erase heads therein.

Also provided with the head assembly design of the present invention are one or more outrigger bars which are preferably mounted on either side of and adjacent to the transducer head parallel to the path of the recording tape. The surface of these horizontal bars facing the recording tape are located in substantially the same plane as the face of the transducer head thereby providing support for the recording tape when the head is positioned near the edge of the tape. Hence, when the tracks lying along the edge of the tape are utilized, the inner horizontal outrigger bar helps to support the tape and thereby prevent the tape from lifting from the head as a result of upward flex curvature, generally known as "anticlastic" curvature, as it travels over the protruding head. A discussion of the anticlastic curvature effect may be found in Handbook of Engineering Mechanics, by W. Flugge, McGraw-Hill Book Co., Inc., New York, First Edition (1962) at pages 45-11 and 45-12.

It has been found that the horizontal outrigger bars eliminate the severe signal loss at the edges of the tape which is associated with conventional head designs. Such loss is particularly critical in multitrack recording systems, such as high speed linear video recorders, where as many as twenty-eight or more tracks may be recorded on a quarter inch wide tape. In such multitrack systems, each track may typically have a width of 6 mil with 2 mil spacing therebetween. Hence, in a twenty-eight track system, at least 222 mil of usable recording space must be found on an approximately quarter inch wide tape, thereby leaving only about 12 mil of unused margin at each edge.

As noted above, with conventional head designs, severe signal loss due to tape flex begins at well over the required 12 mil margin distance, often times as much as 59 mil from the tape edges. However, with the present horizontal outrigger design, it has been found that satisfactory high frequency signal output may be maintained up to approximately the 12 mil required margin.

Furthermore, the horizontal outrigger design of the present invention has the further advantage of reducing head wear in that the total pressure of the tensioned tape is reduced across the head surface in that such outrigger bars help to support the tape as it passes over the head.

DESCRIPTION OF THE DRAWINGS

FIG. 1 is a top sectional view taken along line 1—1 of FIG. 2 of a magnetic transducer device with outrigger bars constructed in accordance with an embodiment of the present invention;

FIG. 2 is a front view of the device shown in FIG. 1 taken along line 2—2 without the tape being shown in front of the device; and FIG. 3 is a side view of the device shown in FIG. 2.

DESCRIPTION OF THE PREFERRED EMBODIMENT

FIGS. 1-3 illustrate an embodiment of a magnetic transducer device 10 constructed in accordance with the present invention. A span of magnetic recording tape 20 is transported past transducer head 30 by means of a transport mechanism (not shown) in a manner such that the head may record or read information on the tape. The entire transducer device 10 may be mounted in a positioning assembly, such as that disclosed by U.S.

Pat. No. 3,839,737, or other well-known means may be utilized to position the head with respect to the various discrete parallel tracks recorded or to be recorded on tape 20.

As is best illustrated by FIGS. 1 and 2, a pair of vertical outrigger bars 40 are symmetrically mounted on either side of head 30. The vertical outrigger bars 40 are secured to mounting block 12 in such a manner that they are held in a rigid relationship with respect to head 30 which is also secured to mounting block 12. Outer surfaces 42 of bars 40 facing the recording tape 20 are located slightly below the plane of the outer surface of transducer head 30 thereby maintaining a constant, shallow wrap angle $\alpha$ of the recording tape over the transducer head. The value of head wrap angle $\alpha$ is determined by the distance the transducer head 30 protrudes beyond the outer surfaces 42 of outrigger bars 40 and the distance said bars are mounted away from the head. However, head wrap angle $\alpha$ will remain constant regardless of the wrap angle $\beta$ of the recording tape over the entire transducer device 10 and regardless of slight misalignments of the transducer device with respect to the tape which may cause the wrap angle $\beta$ to differ with respect to each of the individual outrigger bars 40.

As is seen in FIG. 1, the outer surfaces 42 of outrigger bars 40 may be formed with a polished, large radius curved surface so as to induce tape fly over them as the tape moves in either direction in a bi-directional transport system. Such tape fly over these outrigger bars, as opposed to tape fly over the head, is desirable in that it eliminates any friction and scrape flutter that may be induced by the bars. Since the tape fly above the bars is very small in relative terms it has no significant effect upon maintaining a constant tape wrap angle $\alpha$ over the transducer head. However, in certain applications it has been found that tape fly over the outrigger bars is not desirable in that it may be advantageous to cause these bars to wear proportionately to the head. An example of such controlled wear patterns is shown in U.S. Pat. No. 3,710,038.

In addition, it has been found that due to the relatively large radius of vertical outrigger bars 40, they may provide a convenient location to mount one or more erase heads 32 for the recording system. Such a design is possible since tape wrap angle and tape to head contact characteristics are not critical with respect to such erase heads.

FIGS. 2 and 3 also illustrate a pair of horizontal outrigger bars 50 secured to mounting block 12 and positioned respectively above and below transducer head 30 along an axis transverse to the path of recording tape 20 as it passes over the head. The horizontal outrigger bar frame assembly 52 may be secured to mounting block 12 by means of an epoxy adhesive as is shown at 60 in FIG. 1 or by other well-known mounting methods. Although a pair of horizontal outrigger bars are shown in the preferred embodiment, it has been found that as few as only one bar is necessary if it is desired to record adjacent to only one edge of the tape, and that in many other systems, utilization of more than a pair of bars is desirable in order to decrease and stabilize the total pressure exerted by the tensioned tape upon the transducer head as its position is varied across the width of the tape.

As is best illustrated in FIG. 3, the surfaces of horizontal outrigger bars 50 facing recording tape 20 are located in substantially the same plane as the face of transducer head 30 so as to provide support for the recording tape when the head is positioned near the edge of the tape. In addition, it has been found desirable due to wear considerations that the horizontal outrigger bars have an outer surface shaped similar to that of the transducer head and that they be constructed of a ferrite material similar to the head, although other shapes and materials may be utilized with satisfactory results.

The specific operational features and advantages discussed above in the summary of the invention were achieved with an embodiment of a magnetic transducer designed in accordance with the present invention which has the following physical characteristics. The vertical outrigger bars 40 as illustrated in FIGS. 1-3 were constructed with a longitudinal height sufficient to accomodate the full width of a quarter inch recording tape as the transducer head, which is located at mid-point of the bars, is moved from edge to edge of the tape. These vertical outrigger bars were finished with polished, coplanar outer surfaces 42 having a radius of 0.25 inch and were symmetrically mounted about the head with their radial centers being approximately 0.4 inch apart.

The outer surface of head 30 contacting the recording tape was formed with a horizontal length of 16 mils and vertical width of 6 mils. A step 31 was formed along both sides of head 30 so as to eliminate tape fly over the head as the tape moved in either direction, the side surfaces of steps 31 forming a sharp and side surfaces edge of about 90° at the intersection of the outer surface/of the head. The pair of horizontal outrigger bars 50 were formed with outer surfaces shaped similarly to head 30, these surfaces being 16 mils in length and 6 mils in width and having similar edges of about 90° formed along their side surfaces. The outer surfaces of the head and horizontal outrigger bars facing the tape are coplanar and protrude into the recording tape approximately 2 to 4 mils beyond the outer surfaces 42 of the vertical outrigger bars during the life of the head assembly. The inner edges of the horizontal outrigger bars were spaced symmetrically about the head 25 to 30 mils apart. Since horizontal outrigger bars 50 are made of the same material and are of about the same physical shape as the transducer head, their wear rate was expected to be about the same as that of the head and horizontal bars 50 remained substantially coplanar with the head surface during the life of the assembly. Sharp edges of about 90° on the outrigger bars have been found to increase the useful life of the head since the head to tape contact area remains substantially unchanged with wear.

With the above-described embodiment it was found that a 40 dB signal to noise ratio could be maintained at 5MH$_z$ with a 30 KH$_z$ bandwidth, the recording tape having a speed of 4m/sec. Signal loss at the outer tracks of a 28 track system was limited to 3dB and tape fly over the transducer head was limited to less than 10 microinch during the life of the device thereby maintaining excellent high frequency output. The transducer head life of the system was projected to be between 300 to 500 hours. These results were obtained with a tape to head contact pressure in the range of 4 to 10 psi and with the edges of the outer tracks of the system being recorded at 12 mils from the edges of the quarter inch recording tape.

While several particular embodiments of the present invention have been shown and described in detail it should be understood that various obvious changes and modifications thereto may be made, and it is therefore intended in the following claims to include all such modifications and changes as may fall within the spirit and scope of this invention.

What is claimed is:

1. In a magnetic transducer assembly of the type wherein a magnetic recording tape is transported under tension along a path extending over the transducing face of a magnetic head, the plane of which protrudes into the magnetic surface of said recording tape causing it to wrap over said magnetic head at an angle as the recording tape approaches and departs said transducing face, the improvement comprising:

a pair of outrigger bars mounted on the transducer assembly transverse to the path along which the recording tape is transported, each of said transverse outrigger bars being spaced from the magnetic head on opposite sides thereof and each of said transverse outrigger bars having an outer surface formed thereon facing the magnetic surface of said recording tape, the plane extending between said outer surfaces being located at a predetermined level below the plane of the transducing face of said magnetic head, whereby the wrap angle at which said recording tape passes over said transducing face is maintained at a constant, shallow value regardless of slight misalignments of the magnetic transducer assembly with respect to said recording tape path thereby inhibiting undesirable tape fly over and wear of the transducing face of said magnetic head.

2. The transducer assembly of claim 1 further comprising a pair of outrigger bars mounted on the transducer assembly parallel to the path along which the recording tape is transported, each of said parallel outrigger bars being spaced from the magnetic head on opposite sides thereof substantially along an axis transverse to said recording tape path extending through the transducing face of said magnetic head and each of said parallel outrigger bars having an outer surface formed thereon facing the magnetic surface of said recording tape which is of substantially the same length as the transducing face of said magnetic head, the plane extending between said outer surfaces being located substantially in the same plane as the transducing face of said magnetic head, whereby said parallel outrigger bars partially support said recording tape as it is transported over said transducing face thereby reducing the contact pressure therebetween and preventing the edges of said recording tape from lifting from said transducing face.

3. The transducer assembly of claim 1 wherein said magnetic head has steps formed along each of its sides transverse to the path along which the recording tape is transported, the side surfaces of said steps forming sharp edges at their intersection with the transducing surface of said magnetic head.

4. The transducer assembly of claim 1 wherein said outer surfaces of the transverse outrigger bars facing the magnetic surface of said recording tape are formed with a relatively large radius of curvature sufficient to induce tape fly thereover.

5. The transducer assemmy of claim 1 further comprising an erase head mounted in one of said outer surfaces of the transverse outrigger bars which faces the magnetic surface of said recording tape.

6. The transducer assembly of claim 1 further comprising a pair of erase heads, each of said erase heads being located on opposite sides of said magnetic head and mounted in said outer surfaces of the transverse outrigger bars facing the magnetic surface of said recording tape.

7. In a magnetic transducer assembly of the type wherein a magnetic recording tape is transported under tension along a path extending over the transducing face of a magnetic head, the plane of which protrudes into the magnetic surface of said recording tape, the improvement comprising:

a pair of outrigger bars mounted on the transducer assembly parallel to the path along which the recording tape is transported, each of said parallel outrigger bars being spaced from the magnetic head on opposite sides thereof substantially along an axis transverse to said recording tape path extending through the transducing face of said magnetic head and each of said parallel outrigger bars having an outer surface formed thereon facing the magnetic surface of said recording tape which is of substantially the same length as the transducing face of said magnetic head, the plane extending between said outer surfaces being located substantially in the same plane as the transducing face of said magnetic head, whereby said parallel outrigger bars partially support said recording tape as it is transported over said transducing face thereby reducing the contact pressure therebetween and preventing the edges of said recording tape from lifting from said transducing face as the magnetic head approaches said edges.

8. The transducer assembly of claim 7 wherein the outer surfaces of said parallel outrigger bars facing the magnetic surface of said recording tape are formed with substantially the same physical shape as the transducing face of said magnetic head.

9. The transducer assembly of claim 7 wherein the outer surfaces of said parallel outrigger bars facing the magnetic surface of said recording tape are constructed of substantially the same material as the transducing face of said magnetic head.

* * * * *